United States Patent

Goodwin

[11] Patent Number: 5,615,575
[45] Date of Patent: Apr. 1, 1997

[54] DRIVE TOOL WITH SENSOR FOR FASTENER DEFLECTION DURING TIGHTENING AND CLAMPING FORCE VALIDATOR

[76] Inventor: Jerry J. Goodwin, 5998 Runnymeade, Canton, Mich. 48187

[21] Appl. No.: 373,256

[22] PCT Filed: May 14, 1993

[86] PCT No.: PCT/US93/04661

§ 371 Date: Jan. 13, 1995

§ 102(e) Date: Jan. 13, 1995

[87] PCT Pub. No.: WO94/27126

PCT Pub. Date: Nov. 24, 1994

[51] Int. Cl.$^6$ ........................................... G01L 5/00
[52] U.S. Cl. ................. 73/862.541; 73/761; 364/508; 411/14; 81/467
[58] Field of Search ................... 73/862.541, 761, 73/862.01, 801, 572; 364/506, 508; 411/8, 9, 10, 11, 14, 44; 81/52, 467; 29/240, 407

[56] References Cited

U.S. PATENT DOCUMENTS

| | | | |
|---|---|---|---|
| 2,889,729 | 6/1959 | Orner | 73/761 |
| 3,969,960 | 7/1976 | Pagano | 73/761 X |
| 4,185,504 | 1/1980 | Exner et al. | 73/761 |
| 4,333,351 | 6/1982 | Bickford | 73/761 |
| 4,829,650 | 5/1989 | Galard | 29/407 |
| 4,909,105 | 3/1990 | Namiki et al. | 81/57.36 |
| 5,211,061 | 5/1993 | Goodwin | 73/761 X |
| 5,312,166 | 5/1994 | Nagano | 411/8 X |

FOREIGN PATENT DOCUMENTS

| | | | |
|---|---|---|---|
| 373658 | 3/1977 | Japan | 411/11 |
| 27126 | 11/1994 | WIPO . | |

OTHER PUBLICATIONS

*Patent Abstracts of Japan* Grp M649, vol. 11, No. 377, Abs Pub. Date Dec. 9, 1987 (G2–148128) Hisakado "Screw Fastening Device".
*Patent Abstracts of Japan* Grp M1017, Vol. 14, No. 399 Abs Pub. Date Aug. 29, 1990 (2–152734) Tomita et al. "Measuring Device for Axial Tension of Bolt Fastening".
*Patent Abstracts of Japan* Grp M1400, vol. 17, No. 206 Abs Pub Date Apr. 22, 1993 (4–348878) Tsuji et al. "Bolt Fastening Tool White(Which) Can Measure Axial Force of Bolt".

Primary Examiner—Thomas P. Noland
Attorney, Agent, or Firm—James M. Deimen

[57] ABSTRACT

A method to accurately determine and assure proper clamping force or bolt tension in fastening systems comprises statistically sampling washer or flanged bolt lots for clamping force versus deflection relationships, encoding the lots and subsequently installing the fasteners to the prescribed deflections of the lots. A validator and validation method is disclosed that provides the statistical sampling and a corresponding sensor device is disclosed for measuring the deflection as the fastener is installed. Thus, the deflection of the washer or bolt flange as the fastener is installed determines the clamping force applied by the fastener and assures that the proper clamping force has been obtained. The new method and sensor are applicable to special flanged bolt and standard bolt—Belleville washer combinations. No modification of the bolts or washers is required.

7 Claims, 5 Drawing Sheets

DRIVE TOOL WITH SENSOR FOR FASTENER DEFLECTION DURING TIGHTENING AND CLAMPING FORCE VALIDATOR

This application is a national divisional application arising from international application PCT/US 93/04661, filed May 14, 1993 and published as WO94/27126 Nov. 24, 1994. Reference is also made to related U. S. patent application Ser. No. 07/730,643, filed Jul. 16, 1991, now U. S. Pat. No. 5,211,061, issued May 18, 1993.

BACKGROUND OF THE INVENTION

The field of the invention pertains to fasteners and means to ascertain the holding or clamping force of an installed fastener. In particular, the invention pertains to threaded fasteners for retaining two or more parts together, however, the invention is not limited to threaded fasteners but may also apply to non-threaded fasteners where sufficient clamping force must also be assured.

In the typical installation the torque required to turn a threaded fastener is used to indirectly indicate the clamping force or assure that sufficient clamping force has been applied. Unfortunately, the torque measured is affected by a variety of parameters only partially controllable. Inaccurate, mismatched, or cross threaded engagement will result in a false torque indication, as will contaminants such as oils, greases or burrs and abrasive particles. Thus, a torque that appears to meet specifications may actuality be insufficient or well beyond the torque required for the proper clamping force.

In order to avoid the difficulties with torque measurements, more direct means of determining the clamping force have been developed. In particular, modifications to the bolt or the washer under the bolt head have been developed and met limited success. U.S. Pat. No. 4,773,272 discloses a washer with a tab disposed in a radial groove. The deflection of the tab as the bolt is tightened provides a measure of the bolt clamping force.

Japanese Patent Document 54-71676 discloses a hollow bolt with a central pin in the bolt. Above the head of the bolt are a pair of measuring rings separated by a gap. As the bolt is tightened the gap closes thereby closing an electric circuit when the proper bolt tension is reached.

U.S. Pat. Nos. 4,294,122 and 3,969,960 disclose ultrasonic means to measure bolt tension. Both disclose contact with the head of the bolt, however, the former requires use of a transducer in the bolt head and the latter requires bolts in which the stretch constant is known. U.S. Pat. No. 4,823,606 discloses a bolt having a diaphragm transducer and strain gages disposed within the bolt to sense loading on the bolt.

A special washer that plastically deforms or crushes under the bolt head at the desired clamping force is disclosed in U.S. Pat. No. 4,333,220 with means to sense the plastic deformation and automatically halt the tightening means. U.S. Pat. No. 4,359,906 discloses a device for tightening a screw into bone and determining the applied torque to prevent over-tightening of the screw and damage to the bone.

Most of the devices above require substantial modification of the bolt or washer which adds considerable expense and limits the applications for the bolts and washers. In addition a complicated measuring device is required in most of the examples. Thus, means are needed to directly measure bolt tension or clamping force in standard bolt and washer installations without significant additional expense.

SUMMARY OF THE INVENTION

It is an object of the invention to provide accurate means to indicate the bolt tension or clamping force in bolted fastening systems using standard bolts, washers, screws and nuts as required. The invention is also applicable to special design flange head bolts or nuts where the washer or flange deflects upon installation. Although disclosed below in terms of a standard bolt and conical washer combination, the invention is applicable to other fasteners where the deflection can be measured in the same manner.

Bolts, washers and bolt-washer combinations in controlled manufactured production lots will have minimal performance variations, one part to another, within each lot, however, the variation from lot to lot may be substantially greater. For example, the force versus deflection relationship to compress a conical washer varies little within a production lot of washers. Thus, in any well manufactured lot the washers or fasteners will deflect essentially identically under the same installation circumstances. There may, however, be dramatic differences from one manufactured lot to another, caused by variations in dimensions, materials, heat treatments and coatings, for example.

Disclosed below is a validation method to statistically sample each manufactured lot to confirm the force versus deflection rate for the lot. A validator is disclosed comprising a calibrated load sensing device, a controlled load applicator and a deflection indicator. The results of a statistical sample can then be printed on or applied to packaging labels for the lot or incorporated into a bar code for the lot. Known statistical process control (SPC) common to the automobile and appliance manufacturing industries can be applied to the force versus deflection data from the validator. Capability indexes "$C_pK$", mean values and statistical averages can be calculated for a sample lot with software such as the "DataMyte", DataMyte Corporation, Minnetonka, Minn. In particular, a deflection under a specified load can be computed as a mean or average maximum deflection for the sample set of the washer lot.

The sensor mechanism on the bolt driving unit can then be calibrated to the lot being utilized on the basis of the statistical validation of the lot. The sensor mechanism comprises a contact means adjacent the bolt driver that senses or measures deflection of the conical washer under the bolt head or deflection of a bolt flange. With the known lot force versus deflection relationship the actual clamping force can be monitored as the bolt is tightened. As disclosed in one embodiment the sensor mechanism can accommodate misalignment of the bolt driver and sensor.

DESCRIPTION OF THE PREFERRED EMBODIMENTS.

Figure 1A:
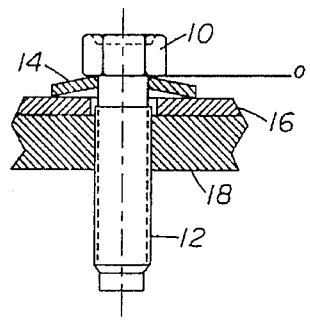
FIGS. 1A, 1B and 1C illustrate the principle upon which the bolt clamping force sensor is based.
Figure 1B:
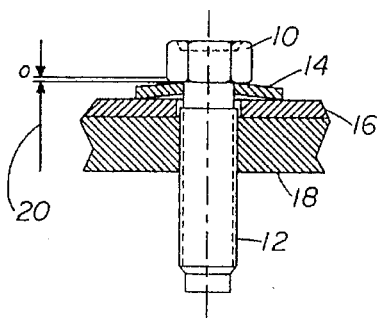
Figure 1C:
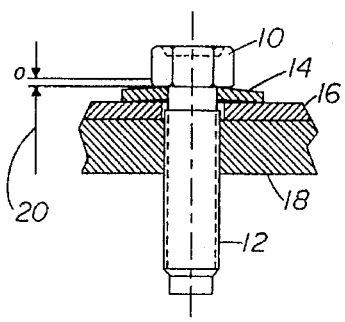

Illustrated in FIGS. 1A, 1B and 1C is a very common fastener used in the automotive and appliance industries. The fastener comprises a bolt 10 having a rolled thread 12 and a conical washer 14 thereon. As shown the fastener connects two plates 16 and 18, plate 18 having a threaded hole engaging the rolled thread 12. In FIG. 1A the bolt 10 is driven to the extent where the conical washer 14 positively engages the plate 16 and underside of the bolt 10 head but no significant load has been applied to the conical washer as indicated by the base line 0. As the bolt is driven further in FIG. 1B the conical washer 14 deflects as indicated by the 0.010 inches deflection 20 from the base line 0. As wild be further described below this deflection represents a specific clamping force on the bolt 10 and plates 16 and 18 as determined from statistical analysis of the washer lot from which the washer 14 was obtained. Doubling the washer 14 deflection 20 to 0.020 inches as shown in FIG. 1C effectively doubles the clamping force on the bolt 10 and the plates 16 and 18. Thus, over the range of deflection of the conical washer 14, the clamping force holding the plates 16 and 18 together can be directly determined by measuring the deflection and applying a force per unit deflection to determine the force.

Figure 2:
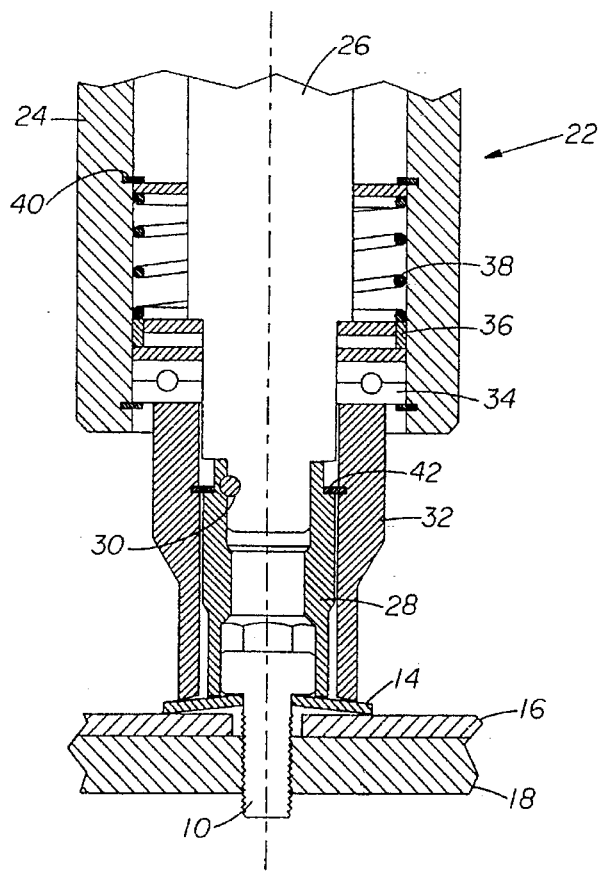
FIG. 2 shows in schematic cross-section the force sensor mechanism in unloaded position.

In FIG. 2 a mechanism to sense the deflection of a conical washer 14 beneath a bolt 10 head is illustrated as part of a drive tool generally denoted by 22. The drive tool comprises a housing 24 and drive shaft 26. To the lower end of the drive shaft 26 a drive socket 28 is attached by a ball detent 30. The socket 28 in turn is engaged with the head of the bolt 10. The sensing mechanism comprises a sleeve 32 in engagement with the conical washer 14 as shown and at the upper end in engagement with a thrust bearing 34. Atop the thrust bearing 34 is a transducer 36 and a coil spring 38 and atop the coil spring 38 is a snap ring 40 in engagement with the inside of the housing 24. Thus, the spring 38 urges the sleeve down into contact with the washer 14. To limit the downward movement of the sleeve 32 a second snap ring 42 engages the sleeve and a shoulder on the socket 28.

Figure 3:
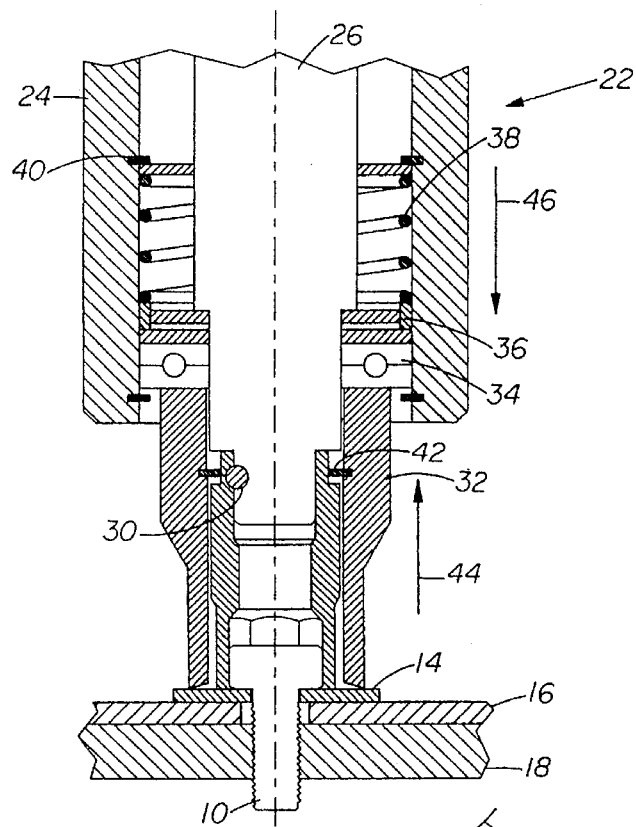
FIG. 3 shows in schematic cross-section the force sensor mechanism upon tightening of a bolt.

In FIG. 2 the transducer 36 may be selected from any number of suitable devices such as a linear variable differential transformer, an air gage or an optical gage. The device need only accurately and repeatably sense relative movement of the sleeve 32 to the drive tool 22. As shown in FIG. 3 the sleeve 32 moves upward 44 relative to the drive tool 22 as the bolt 10 is driven 46 and the conical washer 14 flattened. Over the range from contact as shown in FIG. 2 until complete flattening is imminent, the deflection of the conical washer 14 bears a linear relationship with the tension or clamping force of the bolt 10. This linear relationship is sensed by the relative motion in the sensor 36 and with suitable minimal processing transformed into a clamping force. Thus, by selecting a suitable washer (washer lot) the required clamping force specified can fall within the linear deflection range of the washer. The drive tool 22 can be set to automatically stop and retract as the specified deflection (clamping force) is reached or the sensor may be used to merely indicate deflection. Although the sleeve 32 is shown resting upon the washer 14, in some situations the washer or bolt head flange is not of sufficient diameter to provide for contact by a sleeve outside the socket 28, thus, in the alternative the sleeve 32 can be set or calibrated to rest on the plate 16.

Typically, the user establishes the "O" point for the sensor transducer 36 by installing a fastener from the lot in a set up gage or actual joint and tightening until clearances are taken up between the fastener, washer and mating surface (plate 16). With socket 28 and sleeve 32 in contact, the tranducer 36 signal can be adjusted to zero clamping force or deflection. Any further movement of the sleeve 32 relative to the socket 28 and tool 22 indicates compression of the washer 14 (deflection and clamping force).

Figure 4:
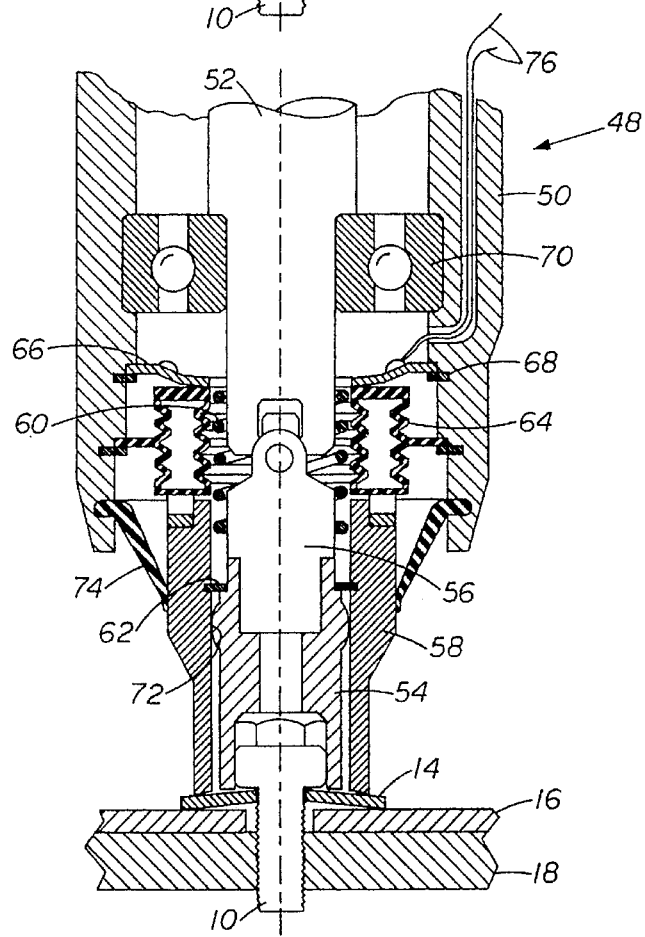
FIG. 4 shows in schematic cross-section an alternate form of the force sensor mechanism in unloaded position.

In FIG. 4 a modified drive tool generally denoted by 48 includes an external housing 50 and internal drive shaft 52. To the lower end of the drive shaft 52 a socket 54 is attached by a universal joint 56. The socket engages a bolt 10 head as above and a sleeve 58 engages a conical washer 14. A light duty coil spring 60 surrounds the universal joint 56 to urge the universal joint 56 and socket 54 into alignment with the drive shaft 52 when the socket is not engaged with a bolt. Downward travel of the sleeve 58 is limited by the snap ring 62 and upward relative movement of the sleeve 58 causes compression of the fluid filled bellows 64 and an upward force on the spring disc 66. The spring disc 66 is fixed to the housing 50 by a shoulder and snap ring 68. The drive shaft 52 engages the housing 50 with a bearing 70 and the socket 54 engages the sleeve 58 in a sliding fit at 72. Thus, the drive shaft 52 and socket 54 rotate relative to the sleeve 58. A boot 74 serves to prevent debris from entering the sensor and universal joint area within the drive tool 48. In case of angular misalignment between the drive shaft 52 and the bolt 10, the universal joint 56 and fluid filled bellows accommodate the misalignment and the relative upward movement of the sleeve 58 is evenly transmitted to the spring disc 66. Strain gages on the spring disc 66 sense the deflection with an electrical output transmitted through the wires 76.

Figure 5:
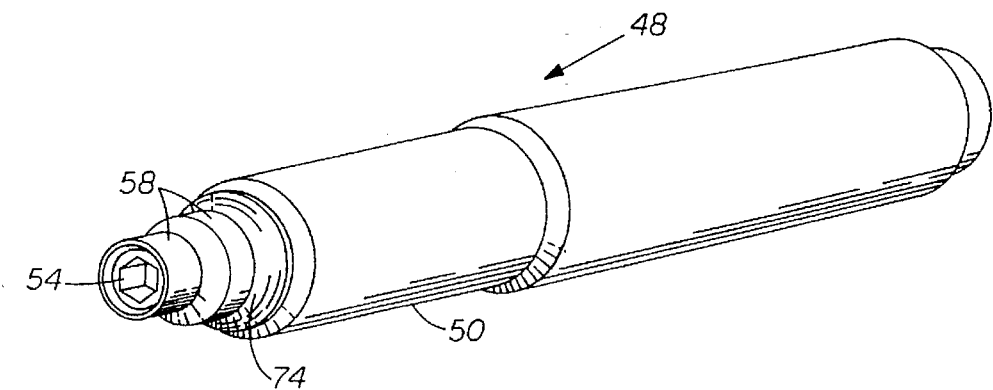
FIG. 5 illustrates in perspective view the exterior of a bolt drive and force sensor mechanism.
Figure 6A:
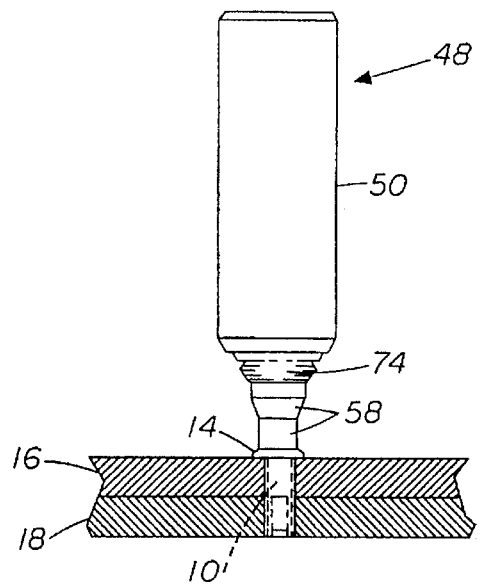
FIGS. 6A and 6B illustrate schematically the flexibility of the alternate form of the bolt drive and force sensor mechanism of FIGS. 4 and 5.
Figure 6B:
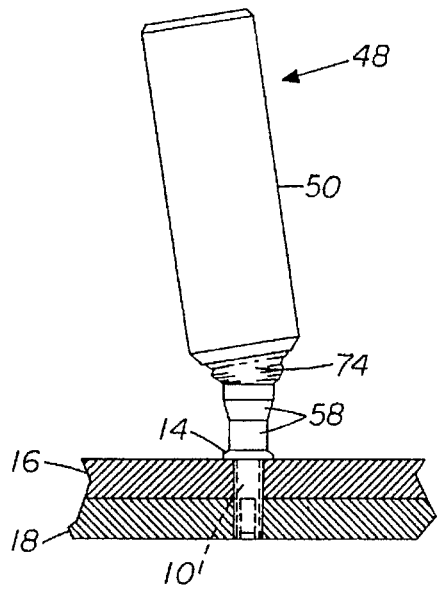

Illustrated in FIGS. 5, 6A and 6B is the exterior of the alternate form of drive tool 48 disclosed in FIG. 4. The sleeve 58 surrounds the socket 54 and the boot 74 engages the sleeve 58 and the housing 50. Thus, the drive tool 48 may operate in proper alignment with the axis of the bolt 10 as shown in FIG. 6A or in the event of some angular misalignment the internal universal joint permits the tool 48 to drive the bolt 10 as shown in FIG. 6B. In both instances the sleeve 58 contacts the conical washer 14 about the bolt head and the internal fluid filled bellows permits the sensing device (spring disc with strain gages) to accurately measure the deflection of the conical washer 14.

Figure 7:
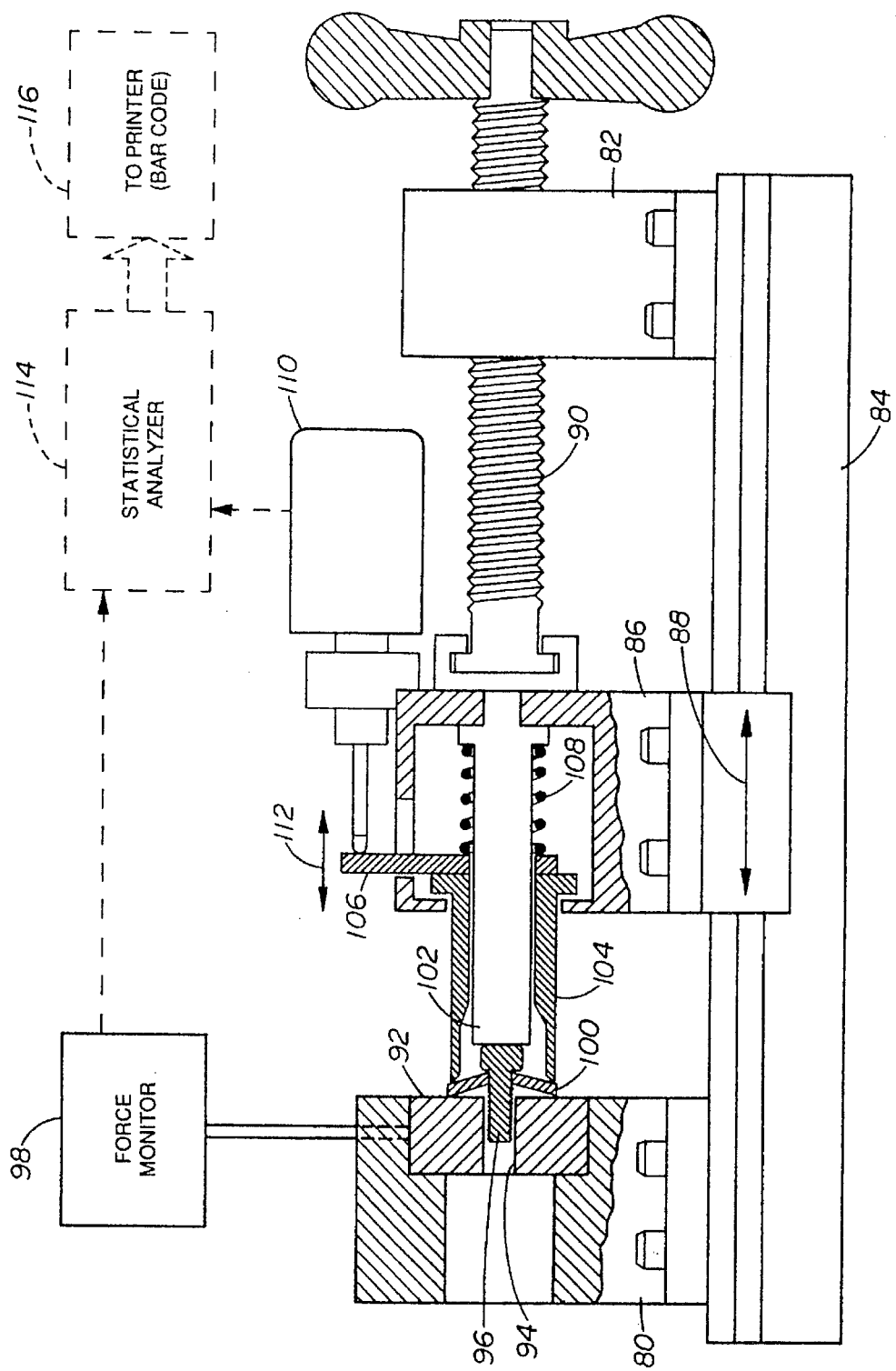
FIG. 7 is a schematic partial cross-section of a validator for statistical performance determination of washer lots.

As briefly noted above in mass production manufacturing where tens and possibly hundreds of thousands of bolt-washer fasteners are used a means of statistically validating the clamping force versus deflection of the conical washers is necessary and the new method of validating is as follows. Illustrated in FIG. 7 is a simple hand operated validator generally indicated by 78. The validator 78 comprises a receiver 80 and screw support 82 fixed to a base 84 and a slide 86 moveable back and forth 88 by a manually operated screw 90. The receiver 80 includes a calibrated load cell 92 having a clearance hole 94 for a bolt 96. The load cell 92 is electrically connected to a force monitor 98. Contacting the load cell 92 is a sample conical washer 100.

The slide 86 includes a plunger 102 which directly contacts both the head of the bolt 96 and the screw 90. Thus, operation of the screw 90 directly forces the washer 100 against the load cell 92 and the force on the washer is directly measured. A sensor sleeve 104 contacts the washer 100 at the same diameter as the drive tool sleeves 32 and 58 in FIGS. 2 and 4 respectively. The sensor sleeve 104 engages an indicator arm 106 in turn engaged by a spring 108 within the slide 86. Thus, the spring 108 urges the sensor sleeve 104 tightly against the washer 100. The indicator arm 106 also engages a digital indicator 110 mounted on the slide 86 as shown. Thus, as the screw 90 drives the bolt 96 head and washer 100 against the load cell 92, the sensor sleeve 104 and arm 106 move relative to the slide 86 and bolt 96 as indicated at 112 and as measured by the indicator 110.

As a part of the validation method the force (98) versus deflection (110) data from a sample plurality of washers from a specific production lot is transmitted to a statistical analyzer 114 and, on the basis of the sampling, a statistical average output force versus deflection provided to a printer 116. The printer 116 may provide a bar code (pounds per inches deflection, for example) that can be affixed to the cartons or pallets of fasteners comprising the production lot.

For example, standard manufacturing techniques are used for fasteners such as disclosed herein. Lot control is currently used on bolts incorporating a conical washer in their design. Lots for such washer and bolt combinations change with material changes in thickness, chemistry, hardness, geometric changes from tooling, etc. Such changes in lots are considered normal operating procedures in industry and as such the new validation procedure does not add additional burden to the manufacture of the washers or boltwasher combinations.

After manufacture, a statistical sample of each lot would be removed before packaging (such as 30 pieces), and tested with the validator above. The bar code in pounds per inches of deflection, for example, is affixed to the lot. Upon receipt of each lot of fasteners the user can simply calibrate the drive tool control system to the lot from the bar code affixed to the lot.

Figure 8:
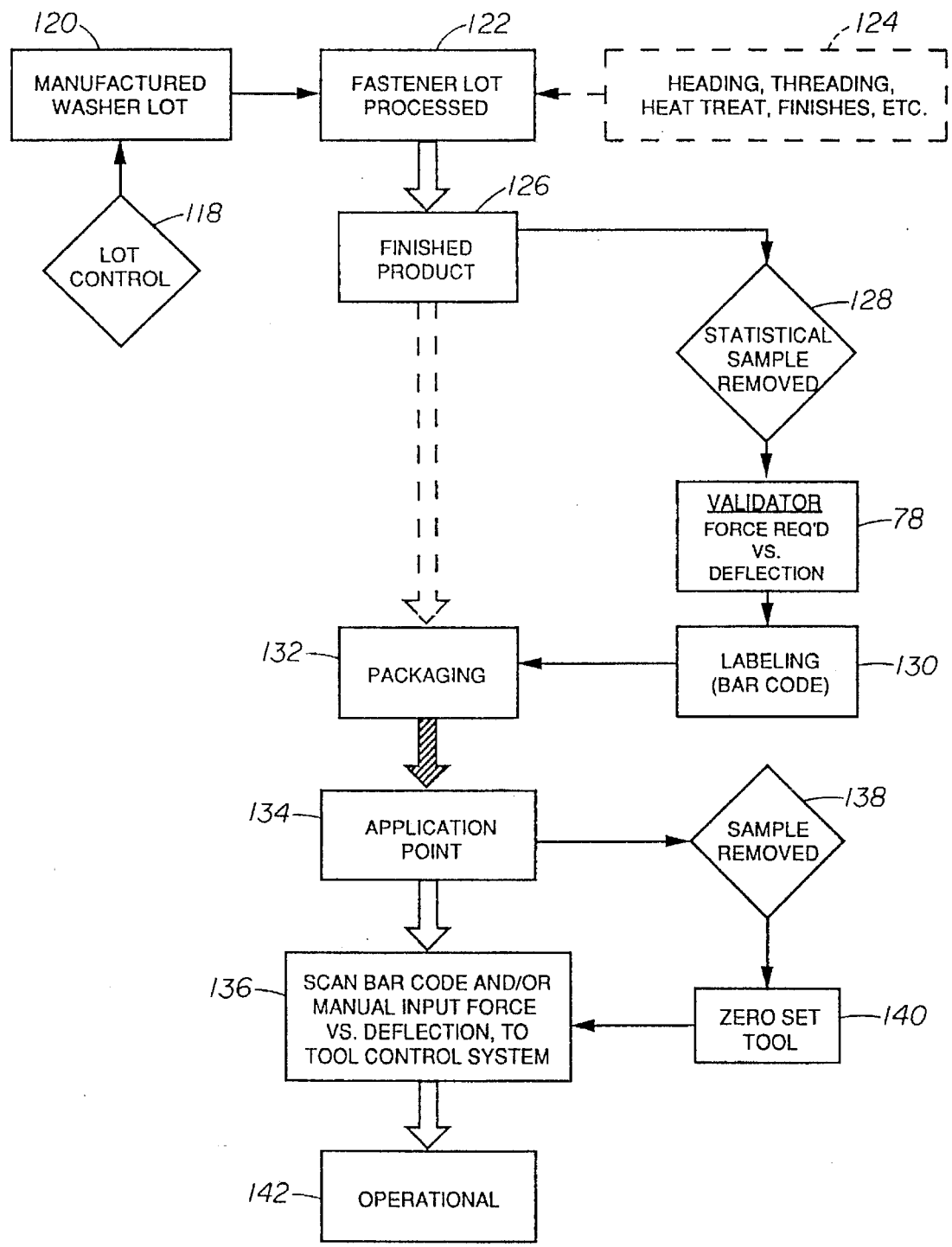
FIG. 8 is a system flow chart for the manufacture of the fasteners and use of the fasteners with the bolt clamping force sensor.

FIG. 8 illustrates the system flow or method for determining and assuring that the proper clamping load is applied to each fastener as it is assembled into a final product. Lot control 118 is applied to the manufacture of washer lots 120 and complete bolt-washer fasteners processed at 122 with heading, threading, heat treat, finishes, etc. indicated at 124. The finished bolt-washer combinations at 126 are statistically sampled at 128 with the validator 78 method above and bar coded or other labeling 130 applied to the packaging at 132.

At this point the lots pass to the user at the application point 134 and the label or bar code scanned 136 to calibrate the drive tool control system to the lot. At the same time a sample bolt-washer is removed 138 from the lot and used to zero set 140 the drive tool (see FIGS. 1 and 4). The entire lot can thus be utilized 142 with assurance that bolt clamping forces will meet specifications.

Returning to FIGS. 2 and 3 this version of the drive tool 22 is directed to robotic and automatic fastener installation systems where the fasteners are automatically fed and high tolerance items in fixtures are joined together. Examples are cylinder heads and oil pans joined to engine blocks, transmission components joined together and bearing caps installed. These joints often require gaskets and typically multiple drive tools tighten a plurality of fasteners simultaneously. With the new sensor each drive tool acts independently to sense the required deflection and clamping force, therefore, stresses inducing deflections in the mating parts can be accommodated and the prescribed clamping force applied at each fastener to provide an even clamping force to the gasketed joint.

The drive tool version of FIGS. 4, 5 and 6 allows for the misalignment of the drive tool to the fastener. This drive tool is directed to hand operated uses and automatic systems for attaching joints with irregular surfaces.

The drive tool may be used as an indicator or gage to inspect previously installed fasteners. With the "0" point previously known inspection of critical safety joints on bridges or boiler piping flanges, for example, can be checked.

For best statistical control of clamping force in finished joints in the case of conical washer type fasteners, specific washer design and manufacturing criteria should be met.

1. The washer must be hardened or otherwise constructed of a material that reacts in the manner of a linear spring.
2. The formulas for Belleville springs apply and specifically the underneath crown height to thickness ratio should be held between 0.3 and 0.6 to one.
3. The washer should never completely flatten before proof load on the bolt is reached, unless specifically designed to do so.
4. Maximum washer deflection should be held to 90% or less of the original crown height, and be at a minimum 0.4 mm (0.015 inches). This will generally allow the sensor sleeve mechanism adequate movement to accurately detect deflection without sophisticated and expensive linear movement sensors in the drive tool.

Fortunately actual manufacturing practices can easily meet these criteria for conical washers commonly in use. Only good lot control discipline is required.

I claim:

1. In a drive tool comprising means to engage an axially moveable first fastener component and supporting means for the engagement means, said engagement means moveable axially with the first fastener component relative to a fastening installation, sensing means on the drive tool adapted to move axially relative to the engagement means and to simultaneously remain stationary relative to the fastening installation as the engagement means tightens the first fastener component into the fastening installation, said relative movement of the sensing means signifying the deflection of a second fastener component as the first fastener component is tightened, means in the drive tool urging the sensing means axially in opposition to the relative movement of the sensing means, and a sensor on the drive tool adapted to externally communicate the relative movement of the sensing means.

2. The drive tool of claim 1 wherein the sensing means comprises a sleeve surrounding the engagement means.

3. The drive tool of claim 1 including universal joint means in the supporting means and connected to the engagement means to permit the engagement means to accommodate angular misalignment of the first fastener component, and means engaging the sensing means and sensor to accommodate angular misalignment of the sensing means to the axis of the drive tool.

4. The drive tool of claim 3 wherein the sensing means is mechanically constrained to angularly move with the engagement means.

5. A validator comprising a load cell adapted to mimic a fastener installation, a plunger adapted to mimic a fastener engagement means axial movement, a sensor sleeve adapted to mimic the sensing means of a drive tool, an indicator adapted to communicate relative movement of the sensor sleeve to the plunger and means to actuate the plunger whereby with a fastener inserted between the load cell and the plunger the deflection of the fastener can be determined from the indicator and the corresponding axial clamping force can be determined from the load cell.

6. The validator of claim 5 including a force monitor in communication with the load cell and a statistical analyzer in communication with the force monitor and the indicator whereby a plurality of fasteners can be sequentially tested for clamping force versus deflection relationships and a statistical clamping force versus deflection relationship for the plurality of fasteners obtained.

7. The validator of claim 6 including a printer in communication with the statistical analyzer to print out the statistical clamping force versus deflection relationship for the plurality of fasteners.

* * * * *